United States Patent
Narayan (10) Patent No.: US 11,947,965 B2
(45) Date of Patent: *Apr. 2, 2024

(54) AUTOMATED ORCHESTRATION OF LARGE-SCALE FLOW LOG TRANSFORMATION

(71) Applicant: Palo Alto Networks, Inc., Santa Clara, CA (US)

(72) Inventor: Krishnan Shankar Narayan, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/816,449

(22) Filed: Aug. 1, 2022

(65) Prior Publication Data

US 2022/0365781 A1 Nov. 17, 2022

Related U.S. Application Data

(63) Continuation of application No. 17/321,175, filed on May 14, 2021, now Pat. No. 11,436,012.

(51) Int. Cl.
*G06F 9/50* (2006.01)
*G06F 9/30* (2018.01)
(Continued)

(52) U.S. Cl.
CPC .......... *G06F 9/3005* (2013.01); *G06F 9/3891* (2013.01); *G06F 9/5005* (2013.01);
(Continued)

(58) Field of Classification Search
CPC . G06F 9/5005; G06F 9/5055; H04L 63/1408; H04L 63/1425
See application file for complete search history.

(56) References Cited

U.S. PATENT DOCUMENTS 10,904,277 B1 1/2021 Sharifi Mehr
11,023,420 B1 6/2021 Savir et al.
(Continued)

OTHER PUBLICATIONS

Palo Alto Networks, Inc., "Enable Flow Logs for GCP Organization", Tech Docs, Palo Alto Networks [online] retrieved on Apr. 23, 2021 from <https://docs.paloaltonetworks.com/prisma/prisma-cloud/prisma-cloud-admin/connect-your-cloud-platform-to-prisma-cloud/onboard-your-gcp-account/enable-flow-logs-for-gcp-organization.html>, 2021, 4 pages.

(Continued)

*Primary Examiner* — Jacob Petranek
(74) *Attorney, Agent, or Firm* — Gilliam IP PLLC (57) ABSTRACT

When a transformation job of flow logs generated for a cloud environment is triggered, a security service determines a parameterized template for batch data processing operations offered by the cloud service provider (CSP) to use based on the type of transformation job. The security service communicates an indication of the template and the corresponding parameter values to a data processing service/pipeline offered by the CSP. The provisioned processing resources retrieve the flow logs from a designated location in cloud storage, complete the transformation, and store the transformed flow logs in a new storage location. If the CSP does not provide a data processing service/pipeline which can perform bulk data transformation, the security service uses a generic parameterized template specifying a transformation job to be run on a cluster. Upon completion, the security service retrieves and analyzes the transformed flow logs as part of threat detection performed for securing the cloud environment.

20 Claims, 4 Drawing Sheets

(51) Int. Cl.
*G06F 9/38* (2018.01)
*G06F 16/18* (2019.01)
*H04L 9/40* (2022.01)

(52) U.S. Cl.
CPC ........ *G06F 9/5055* (2013.01); *G06F 16/1805* (2019.01); *H04L 63/1408* (2013.01); *H04L 63/1425* (2013.01)

(56) References Cited

U.S. PATENT DOCUMENTS

| | | |
|---|---|---|
| 2006/0173926 A1 | 8/2006 | Kornelson et al. |
| 2013/0291087 A1 | 10/2013 | Kailash et al. |
| 2019/0036953 A1 | 1/2019 | Balupari |
| 2020/0134046 A1 | 4/2020 | Natanzon et al. |
| 2021/0234901 A1 | 7/2021 | Thomas et al. |
| 2022/0021695 A1 | 1/2022 | Papamartzivanos et al. |
| 2022/0131835 A1 | 4/2022 | Fenton et al. |
| 2022/0335013 A1* | 10/2022 | Ciubotariu .......... G06F 16/1744 |

OTHER PUBLICATIONS

Palo Alto Networks, Inc., "Flow Log Compression on GCP", TechDocs, Palo Alto Networks [online] retrieved on May 14, 2021 from <https://docs.paloaltonetworks.com/prisma/prisma-cloud/prisma-cloud-admin/connect-your-cloud-platform-to-prisma-cloud/onboard-your-gcp-account/dataflow-compression.html>, 2021, 3 pages.

Lemoudden, et al., "A Binary-Based MapReduce Analysis for Cloud Logs", Procedia Computer Science, vol. 83, ISSN 1877-0509, 2016, pp. 1213-1218.

Lin, et al., "Log analysis in cloud computing environment with Hadoop and Spark", 5th IEEE International Conference on Broadband Network & Multimedia Technology, 2013, pp. 273-276.

Mavridis, et al., "Log File Analysis in Cloud with Apache Hadoop and Apache Spark", Proceedings of the Second International Workshop on Sustainable Ultrascale Computing System (NESUS 2015) Krakow, Poland Sep. 10-11, 2015, p. 51-62.

* cited by examiner

AUTOMATED ORCHESTRATION OF LARGE-SCALE FLOW LOG TRANSFORMATION

BACKGROUND

The disclosure generally relates to data processing and to extract, transform, and load procedures.

Flow logs include recorded information about incoming and outgoing Internet Protocol (IP) traffic for network interfaces in a cloud environment. Cloud service providers (CSPs) generate flow logs through sampling and recording inbound and outbound network flows among deployed entities in the cloud environment, where sampling rates vary by CSP. Flow logs are commonly leveraged for monitoring network traffic and analyzing cloud security. For instance, flow logs can be analyzed for use cases in network forensics, for determining IP addresses involved in detected security incidents, and detection of anomalous network traffic.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to ETL for flow logs in which the flow logs are transformed through compression in illustrative examples. Aspects of this disclosure can be instead applied to other transformations of flow logs, such as reformatting flow logs. In other instances, well-known instruction instances, protocols, structures and techniques have not been shown in detail in order not to obfuscate the description.

Overview

Although flow logs are informative for detecting anomalous network traffic or other security issues in a cloud environment, flow log analysis can be expensive for customers due to high egress costs associated with providing high volumes of flow log data to a security service which performs the analysis. Flow log records accumulated daily can amount to several terabytes of stored data due to rapid sampling of network traffic by which flow logs are generated. Additionally, CSPs do not natively support large-scale transformation of flow logs to be exported, such as bulk compression of flow logs to be pulled by the security service.

Described herein are techniques for automated orchestration of large-scale transformation of flow logs, including compression of flow logs to reduce egress costs associated with security analysis of flow logs, while resolving the lack of native support for automated flow log transformation. When a transformation job of flow logs generated for a cloud environment is triggered, a security service which orchestrates flow log transformation operations determines a parameterized template for batch data processing operations offered by the CSP which should be used based on the type of transformation job to be performed (e.g., flow log compression). The security service triggers the transformation job by communicating an indication of the template and the corresponding parameter values to a batch data processing service or data processing pipeline offered by the CSP. The provisioned processing resources which perform the job retrieve the flow logs from a designated location in cloud storage, complete the transformation, and store the transformed flow logs in a new storage location. In some cases, the CSP which offers the cloud environment may not provide a batch data processing service or data processing pipeline which can perform bulk data transformation. In this case, the security service can use a genericized parameterized template which specifies a transformation job to be run on a cluster. Upon completion of the job, the security service retrieves the transformed flow logs from their location in cloud storage. Once the security service determines that the transformation job was successful, the raw, untransformed flow logs can be removed from cloud storage, thus preventing unnecessary accrual of data storage costs. The security service can then analyze the flow logs as part of threat detection performed for securing the cloud environment.

Example Illustrations

Figure 1:
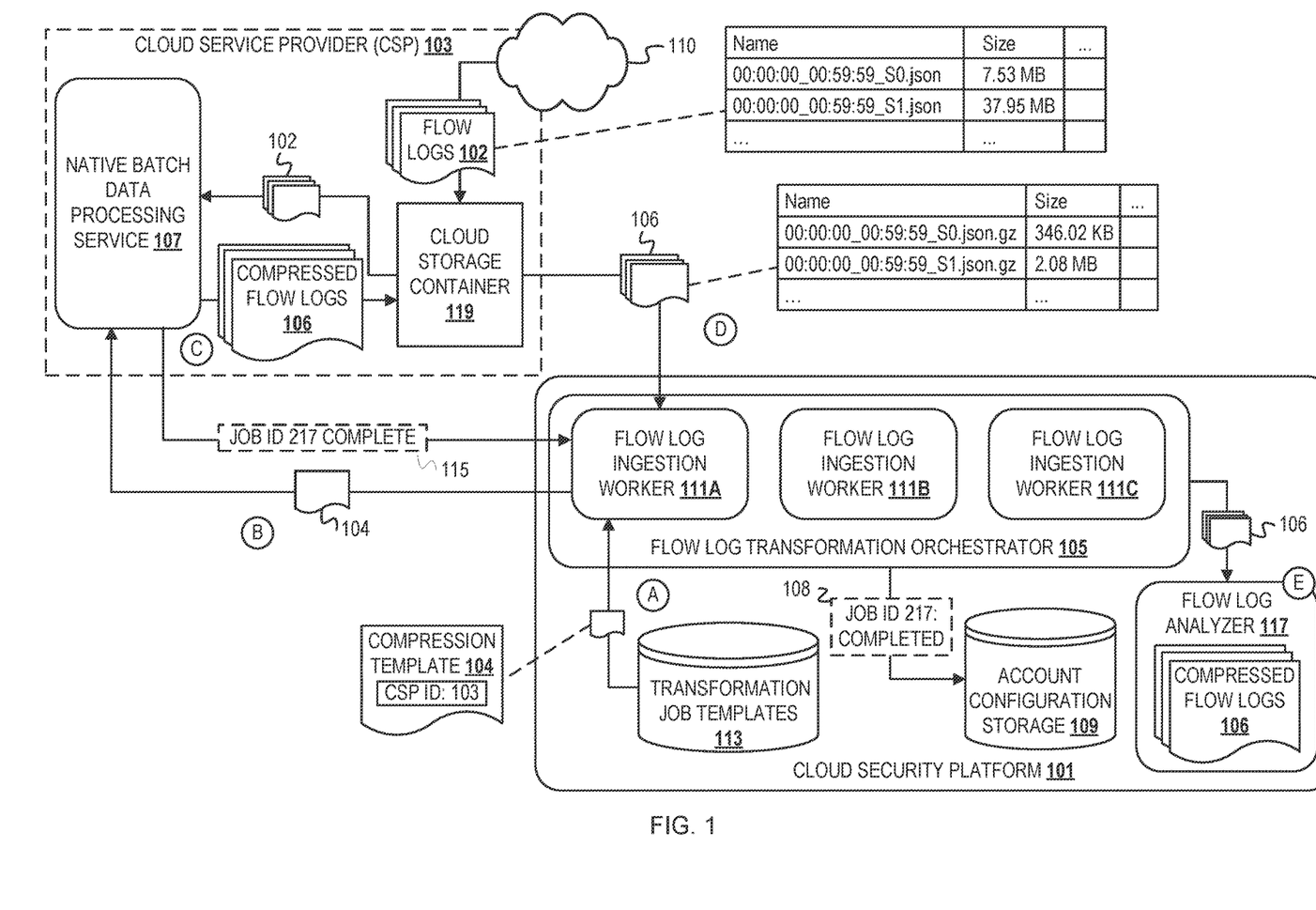
FIG. 1 depicts a conceptual diagram of automated orchestration of large-scale transformation of flow logs which are analyzed for security threat detection.

FIG. 1 depicts a conceptual diagram of automated orchestration of large-scale transformation of flow logs which are analyzed for security threat detection. A cloud security platform 101 provides security for a cloud 110 offered by a CSP 103. For instance, a customer of the CSP 103 can link an account associated with the cloud 110 with the cloud security platform 101. A logging service of the CSP 103 captures flow logs 102 for network interfaces of instances running in the cloud 110 (e.g., virtual machine instances) based on sampling incoming and outgoing network traffic for the network interfaces and stores the flow logs 102 in a cloud storage container 119. In this example, the flow logs 102 include flow log data sampled for different network interfaces of the cloud 110 over the course of an hour. A first example flow log named "00:00:00_00:59:59_S0.json" has a size of 7.53 megabytes (MB). A second example flow log named "00:00:00_00:59:59_S1.json" has a size of 37.95 MB. The cloud storage container 119 provides storage for the flow logs 102 and other data to be exported to the cloud security platform 101. For example, the cloud storage container 119 may be a storage bucket. The cloud security platform 101 includes a flow log transformation orchestrator ("transformation orchestrator") 105 which orchestrates bulk transformation of flow logs. The transformation orchestrator 105 includes three workers—a flow log ingestion worker 111A, a flow log ingestion worker 111C, and a flow log ingestion worker 111C—although the number of workers executing as part of the transformation orchestrator 105 can vary among implementations or may be scalable based on workload.

FIG. 1 is annotated with a series of letters A-E. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, the transformation orchestrator 105 initiates transformation and collection of the flow logs 102. Flow log transformation and collection can be performed for flow logs generated for the cloud 110 according to a schedule or after passage of a configurable interval of time (e.g., hourly). The transformation orchestrator 105 may thus initiate transformation of the flow logs 102 at a scheduled time, upon determining that the interval of time has elapsed, etc. In this example, the scheduled transformation job is a compression of the flow logs 102. The transformation orchestrator 105 may have knowledge of the location in the cloud storage container 119 where the flow logs 102 indicated for compression are located (e.g., a file path to a directory). As an example, the cloud security platform 101 can be provided a location in the cloud storage container 119 at which flow logs for the cloud 110 will be stored at the time that the corresponding account is linked with the cloud security platform 101. The transformation orchestrator 105 dispatches the flow log ingestion worker ("worker") 111A to perform the transformation job for the flow logs 102 stored in the provided location in the cloud storage container 119.

The worker 111A determines that a compression template 104 which corresponds to the CSP 103 should be used for the scheduled compression of the flow logs 102 and obtains the compression template 104 from a repository 113 of transformation job templates maintained by or accessible to the transformation orchestrator. The repository 113 maintains templates for transformation jobs that are compatible with data processing services or pipelines offered across CSPs. The templates stored in the repository 113 may be templates for different transformation job types and/or templates compatible with different CSP-supported batch data processing services, data processing pipelines, etc. The templates may indicate a sequence of instructions for performing the corresponding transformation job and/or data/metadata for completing the job, such as job name, region in which the cloud storage container 119 is located, etc. The templates can also be parameterized and may accept one or more parameters, such as read location and write location. The compression template 104 which the worker 111A determines should be used is may accept the location in the cloud storage container 119 from which to read the flow logs 102, an output storage location for storing the flow logs 102 that have been compressed in the cloud storage container 119, and an indication of a compression algorithm to use as parameters. Although FIG. 1 depicts an example of a compression job initiated by the transformation orchestrator 105, other transformation jobs can be initiated and performed for transforming the flow logs 102 into different formats or representations.

At stage B, the worker 111A communicates a request to a native batch data processing service ("service") 107 offered by the CSP 103 to trigger a compression job specified by the compression template 104. The service 107 may be a service or data processing pipeline which implements MapReduce or another distributed computing technique for bulk, parallelizable data processing. The worker 111A may communicate the request to the service 107 via an API exposed by the CSP 103. For instance, the worker 111A may issue a request to the service 107 via an API of the CSP 103 which indicates the compression template 104 (e.g., with a name, identifier, etc. of the template or job specified by the template) and values of the one or more parameters accepted by the compression template, such as the locations in the cloud storage container 119 from which to read and to which to write and an indication of the compression algorithm to be performed. The service 107 initiates the compression job for the flow logs 102 based on receiving the request indicating the compression template 104.

Prior to communicating the request to the service 107, the worker 111A may verify that the compression job will not exceed storage capacity limits in the cloud storage container 119 for the associated account. For instance, the worker 111A can evaluate the current capacity and maximum capacity in the cloud storage container 119 for the account, which may be indicated in a corresponding entry in an account configuration storage 109, as well as the size of the flow logs 102. The worker 111A may request that the service 107 initiate the compression job for the flow logs 102 if the estimated size of the flow logs 102 once compressed (e.g., based on historical compression job data) will not cause the current capacity in the cloud storage container 119 to exceed the maximum capacity.

At stage C, the service 107 completes the compression of the flow logs 102 specified by the compression template 104 and generates compressed flow logs 106. The service 107 reads the flow logs 102 from the location in the cloud storage container 119 provided with the compression template 104, compresses the flow logs 102 based on the compression algorithm indicated in the compression template 104, and writes the compressed flow logs 106 which result to the provided output storage location in the cloud storage container 119. The service 107 generates a notification 115 indicating that the compression job has successfully completed and communicates the notification 115 to the worker 111A. As a result of compression, the size of the first example flow log is reduced from 7.53 MB to 346.02 kilobytes (KB), and the size of the second example flow log is reduced from 37.95 MB to 2.08 MB.

At stage D, the worker 111A obtains the compressed flow logs 106 from the cloud storage container 119. Receipt of the notification 115 indicating that the compression job was completed successfully prompts the worker 111A to retrieve the compressed flow logs 106 from the designated output location of the cloud storage container 119. Because the transformation orchestrator 105 leverages the service 107 for compression of the flow logs 102 which leverages provisioned resources of the CSP 103 rather than resources of the cloud security platform 101, the worker 111 thus downloads the compressed flow logs 106 rather than the flow logs 102 from the cloud storage container 119, and the associated egress costs are substantially reduced due to the reduction in size of the flow logs 102. Once the worker 111A has acquired the compressed flow logs 106, the flow logs 102 can be removed from the cloud storage container 119, thereby further reducing costs by preventing accrual of superfluous storage costs. The worker 111A generates an update 108 for the account associated with the compression job and inserts the update 108 into the account configuration storage 109. The update 108 indicates that the compression job was completed successfully and may also indicate updated usage of the cloud storage container 119 for the account associated with the cloud 110. For instance, the update 108 may indicate the sizes of the compressed flow logs 106 stored in the cloud storage container 119 and ingested by the worker 111A as well as the sizes of the flow logs 102 removed from the cloud storage container 119.

At stage E, the worker 111A loads the compressed flow logs 106 into a flow log analyzer 117 offered as part of the cloud security platform 101 for analysis. The flow log analyzer 117 analyzes the compressed flow logs 106 as part of performing threat detection. The flow log analyzer 117 can analyze the compressed flow logs 106 to determine whether the compressed flow logs 106 are indicative of anomalous network traffic among network interfaces within the cloud 110A. Alternatively or in addition, the flow log analyzer 117 can analyze the compressed flow logs 106 to determine IP addresses associated with known or suspected threats affecting the cloud 110 detected by other services offered by the cloud security platform 101. The transformation orchestrator 105 managing compression or other transformation of flow logs which the flow log analyzer 117 analyzes before they are retrieved substantially reduces the costs associated with flow log analysis without sacrificing the amount of flow log data available for the threat analysis.

Figure 2:
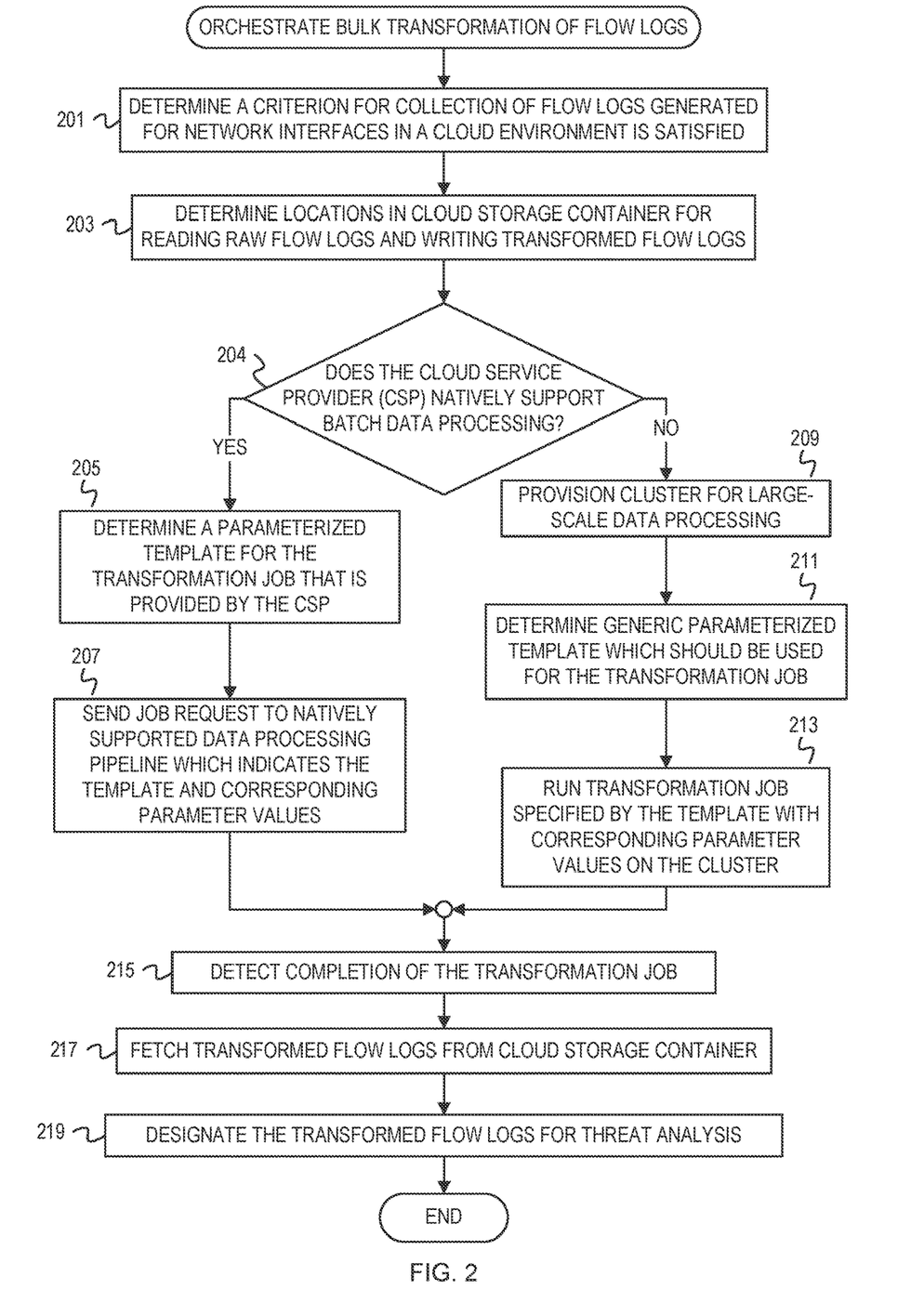
FIG. 2 is a flowchart of example operations for orchestrating bulk transformation of flow logs.
Figure 3:
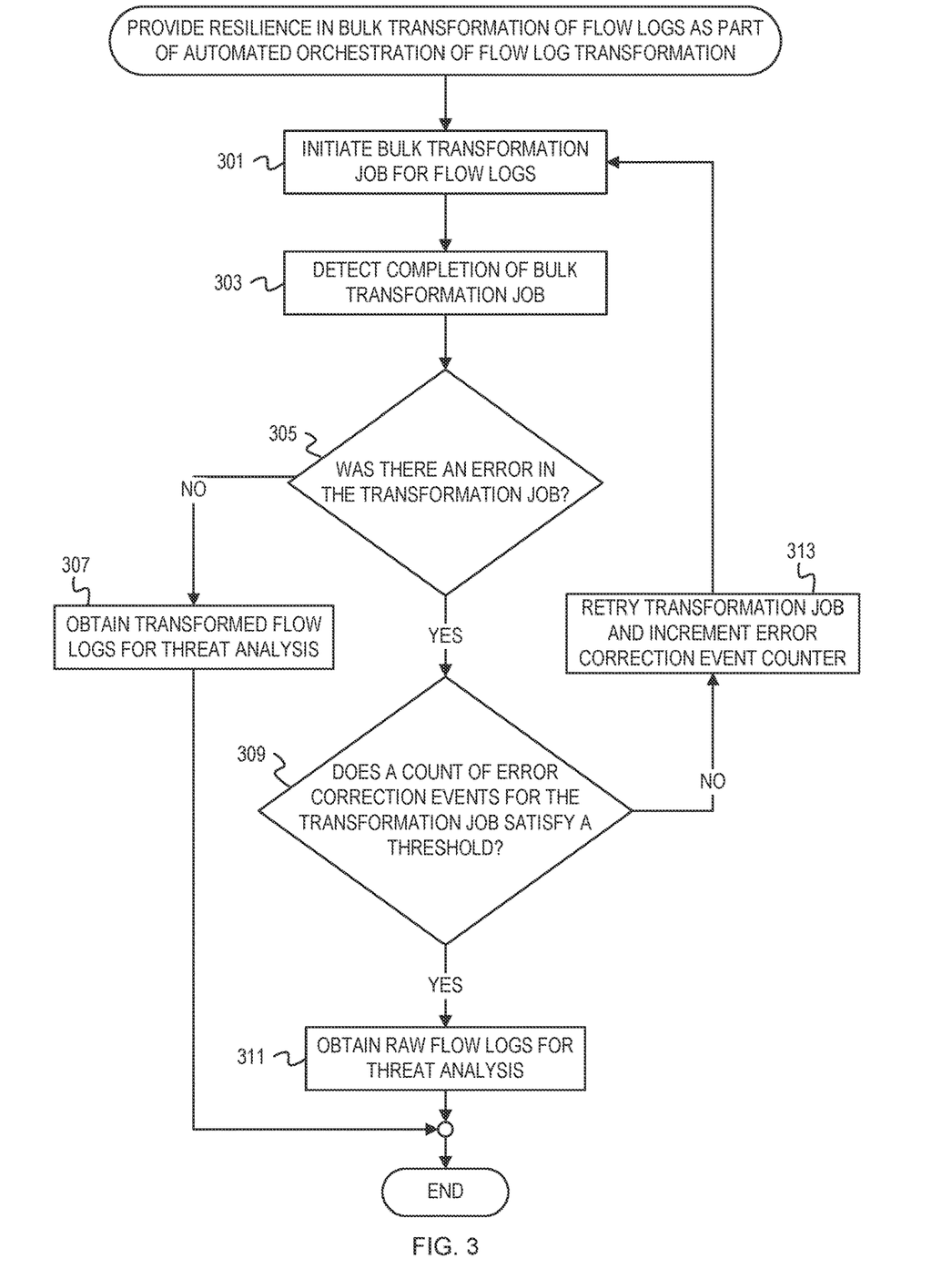
FIG. 3 is a flowchart of example operations for providing resilience in bulk transformation of flow logs as part of automated orchestration of flow log transformation.

FIGS. 2 and 3 are flowcharts of example operations for automated orchestration of large-scale ETL operations for flow logs. The example operations are described with reference to a flow log transformation orchestrator (hereinafter the "transformation orchestrator") for consistency with the earlier figures. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 2 is a flowchart of example operations for orchestrating bulk transformation of flow logs. At block 201, the transformation orchestrator determines that a criterion for collection of flow logs generated for network interfaces in a cloud environment is satisfied. The criterion may be that a current time is indicated in a schedule for flow log collection or that a defined interval of time has elapsed since the previous flow log collection event. For instance, flow log collection can be scheduled to occur on an hourly basis. Flow logs can be transformed (e.g., compressed) prior to collection. Determining that the criterion for flow log collection has been satisfied triggers transformation of the flow logs that is to be performed prior to the collection.

At block 203, the transformation orchestrator determines locations in a cloud storage container for reading raw flow logs (i.e., the flow logs to be transformed) and writing transformed flow logs. The location for reading raw flow logs may be a file path and a file pattern for one or more flow logs stored at that file path. The location for writing transformed flow logs may be a file path for a directory where the transformed flow logs are to be stored. The locations in the cloud storage container where flow logs generated for the cloud environment are stored and where transformed flow logs are to be written may be provided at the time that a cloud account is linked, onboarded, etc. with the transformation orchestrator to enable flow log analysis capabilities.

At block 204, the transformation orchestrator determines if the CSP natively supports batch data processing. Whether or not the CSP natively supports batch data processing can vary among CSPs. CSPs which natively support batch data processing can offer a batch data processing service (e.g., a service implementing MapReduce for parallelized data processing) or a data processing pipeline capable of performing batch data processing that customers may utilize. The CSP can also provide predefined templates corresponding to jobs which can be run using the batch data processing service or data processing pipeline which it offers. The transformation orchestrator determines if the CSP offering the cloud environment for which the flow logs were collected is one which provides a batch data processing service, data processing pipeline, etc. which can be leveraged for the transformation job. If the CSP natively supports batch data processing, operations continue at block 205. If the CSP does not natively support batch data processing, operations continue at block 209.

At block 205, the transformation orchestrator determines a parameterized template which should be used for the transformation job that is provided by the CSP. The template which the transformation orchestrator determines should be used is based on the CSP offering the batch data processing service or data processing pipeline which will be utilized for completing the job and the type of transformation job. For instance, the transformation job may be a compression job to be performed for compressing the flow logs. The transformation orchestrator will thus determine that a template for bulk compression of files provided by the batch data processing service/data processing pipeline of the appropriate CSP should be used. The template is parameterized such that it accepts one or more parameters for the specified job. Examples of parameters which the template may accept include an input file pattern or location which corresponds to the files to be transformed and an output location to which to write the transformed files. For the example in which the template is a template for a compression job, the template may also accept an indication of a compression algorithm as a parameter (e.g., gzip).

At block 207, the transformation orchestrator sends a job request to the natively supported data processing pipeline or batch data processing service offered by the CSP which indicates the template and corresponding parameter values. The parameter values include the locations in the cloud storage container from which to read raw flow logs and to which to write transformed flow logs. The manner in which the transformation orchestrator provides the parameter values to the template can vary across CSPs depending on how the data processing pipeline/batch data processing service accepts parameters for parameterized jobs. The transformation orchestrator may send the job request indicating the template for the specified transformation job and the parameter values to the data processing pipeline or batch data processing service via an API exposed by the CSP. Although the batch data processing service or data processing pipeline which is leveraged for performing the job can vary among CSPs, the transformation job specified by the template should be initiated upon receipt of the job request. The batch data processing service or data processing pipeline reads the flow logs from the provided location in storage, performs the specified transformation on the flow logs (e.g., flow log compression), and writes the resulting flow logs as they are transformed to the provided output storage location.

At block 209, the transformation orchestrator provisions a cluster for large-scale data processing. For cases in which the CSP does not provide its own batch data processing service or data processing pipeline, the transformation orchestrator provisions the infrastructure which achieves the large-scale, batch data processing. For instance, the transformation orchestrator can execute a script(s) for creating a cluster which runs an analytics engine.

At block 211, the transformation orchestrator determines a generic parametrized template which should be used for the transformation job. The template is said to be generic because the template is not specific to a CSP and can be used for running the transformation job on the provisioned cluster regardless of the identity of the CSP which lacks the native support for templatized transformation operations. The template can specify a sequence of batch data processing steps for sorting/ordering and partitioning the flow log data to be performed as part of completing the transformation job. For instance, the template can comprise a parameterized MapReduce program. The parameters which the template accepts can include an input file pattern or location which corresponds to the files to be transformed and an output location to which to write the transformed files. The transformation orchestrator may support multiple generic parameterized templates which correspond to transformation jobs which may be completed. In this case, the transformation orchestrator can determine that the generic template which corresponds to the transformation job indicated for the flow logs should be used. As another example, the transformation orchestrator may support one "universal" parameterized template which can be utilized for jobs of different types and accepts a parameter indicating the type of transformation job which should be performed (e.g., based on an algorithm to implement). As an example, for the case in which the transformation job to be performed is a compression job, an indication of a compression algorithm can be provided to the universal template as a value for the job type parameter.

At block 213, the transformation orchestrator runs the transformation job specified by the template with corresponding parameter values on the cluster. The transformation orchestrator may execute a script(s) for running programs on the cluster which specifies the template or instructions included therein and the corresponding parameter values. As another example, the transformation orchestrator can communicate an indication of the template and the corresponding parameter values to the cluster via an API exposed by the cluster. The parameter values may include an indication of the location in the cloud storage container of the flow logs to be transformed (i.e., the file(s)/directory from which to read), an indication of a location in the cloud storage container to which to write the transformed flow logs. The parameter values may also include an indication of a type of the transformation job or the algorithm to implement for the transformation job (e.g., gzip for a compression job).

At block 215, the transformation orchestrator detects completion of the transformation job. If the transformation job was performed by utilizing natively supported batch data processing of the CSP, the transformation orchestrator may detect completion of the transformation job based on receiving a notification indicating completion of the job from the natively supported service. If the transformation job was run on a cluster provisioned for the job that is external to the services of the CSP, the transformation orchestrator may detect completion of the transformation job based on receiving a notification from the cluster on which the job was run.

At block 217, the transformation orchestrator fetches the transformed flow logs from the cloud storage container. The transformation orchestrator can fetch the transformed flow logs from the location to which to write the transformed flow logs that was provided as a parameter value for the template. The transformation orchestrator may retrieve the transformed flow logs based on communicating a request to the CSP which indicates the location in the cloud storage container to which the transformed flow logs were written (e.g., via the API exposed by the CSP).

At block 219, the transformation orchestrator designates the transformed flow logs for threat analysis. The transformed flow logs can be analyzed for detection of threats, identifying IP addresses associated with detected threats or attacks, etc. upon retrieval from the cloud storage container. For instance, for the example in which the transformation job performed for the flow logs is a compression job, the compressed flow logs can be analyzed for threats impacting the entities running on or deployed to the cloud. The transformation can load the transformed flow logs into a threat analyzer or indicate to a threat analyzer that the transformed flow logs are ready for analysis.

FIG. 3 is a flowchart of example operations for providing resilience in bulk transformation of flow logs as part of automated orchestration of flow log transformation. The transformation orchestrator provides resiliency in the event that errors occur during the transformation job so that flow log analysis is not detrimentally impacted by the errors.

At block 301, the transformation orchestrator initiates a bulk transformation job for flow logs. The transformation orchestrator initiates a decentralized bulk transformation job as described in reference to FIG. 2. For instance, if the CSP providing the cloud environment for which the flow log data were recorded natively supports batch data processing, the transformation job can be initiated based on the transformation orchestrator communicating a job request to an available instance of the batch data processing service or data processing pipeline offered by the CSP. If the CSP does not natively support batch data processing, the transformation job can be initiated by the transformation orchestrator provisioning a cluster and running the transformation job on the cluster.

At block 303, the transformation orchestrator detects completion of the transformation job. The transformation orchestrator may detect completion based on receiving a notification indicating completion of the job from the batch data processing service or data processing pipeline provided by the CSP which performed the job or the cluster on which the job was run.

At block 305, the transformation orchestrator determines if there was an error in the transformation job. The transformation orchestrator may determine if there was an error in the transformation job based on the received notification indicating completion of the job. For instance, the notification may indicate that the job was successful or that the job was unsuccessful. Alternatively, or in addition, the transformation orchestrator can retrieve a random sample of the transformed flow logs from the location in the cloud storage container. The transformation orchestrator can analyze the selected random sample to determine whether the transformed flow log data conform to an expected format. The transformation orchestrator can determine that an error occurred if the data do not conform to the expected format. If there was not an error in the transformation job, operations continue at block 307. If there was an error in the transformation job, operations continue at block 309.

At block 307, the transformation orchestrator obtains the transformed flow logs for threat analysis. The transformation orchestrator obtains the transformed flow logs from the designated location in the cloud storage container and can proceed with performing threat analysis using the transformed flow logs. Once the transformed flow logs have been obtained, the transformation orchestrator may request that the raw, untransformed flow logs are removed from the cloud storage container. Removal of raw flow logs indicated for transformation from storage can thus be delayed until after both verifying that the transformation job was successful and obtaining the transformed flow logs for analysis.

At block 309, the transformation orchestrator determines if a count of error correction events for the transformation job satisfies a threshold. The transformation orchestrator may maintain counters for each transformation job in progress (e.g., based on an identifier of the transformation job) which are incremented upon initiation of an error correction event or corrective action for jobs determined to have produced errors. A threshold can be maintained which corresponds to a maximum number of error correction events or corrective actions which should be taken before reverting to the raw flow logs for threat analysis. If the count of error correction events for the current transformation job exceeds a threshold, operations continue at block 311. If the count of error correction events does not exceed a threshold, operations continue at block 313.

At block 311, the transformation orchestrator obtains the raw flow logs for threat analysis. The transformation orchestrator obtains the raw flow logs from the original location in the cloud storage container that was provided as a location from which to read flow logs when the transformation job was initiated. The transformation orchestrator may also request that any transformed flow logs written to the cloud storage container as part of the transformation job which produced errors are removed from storage.

At block 313, the transformation orchestrator retries the bulk transformation job and increments the error correction event counter. The transformation orchestrator retries the transformation job specified by the template used for initiating the transformation job which produced errors. The transformation orchestrator may also request that any transformed flow logs written to the cloud storage container as part of the transformation job which produced errors are removed from storage. Operations continue at block 301, where the transformation orchestrator initiates a bulk transformation job as an additional attempt at the current job.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 4:
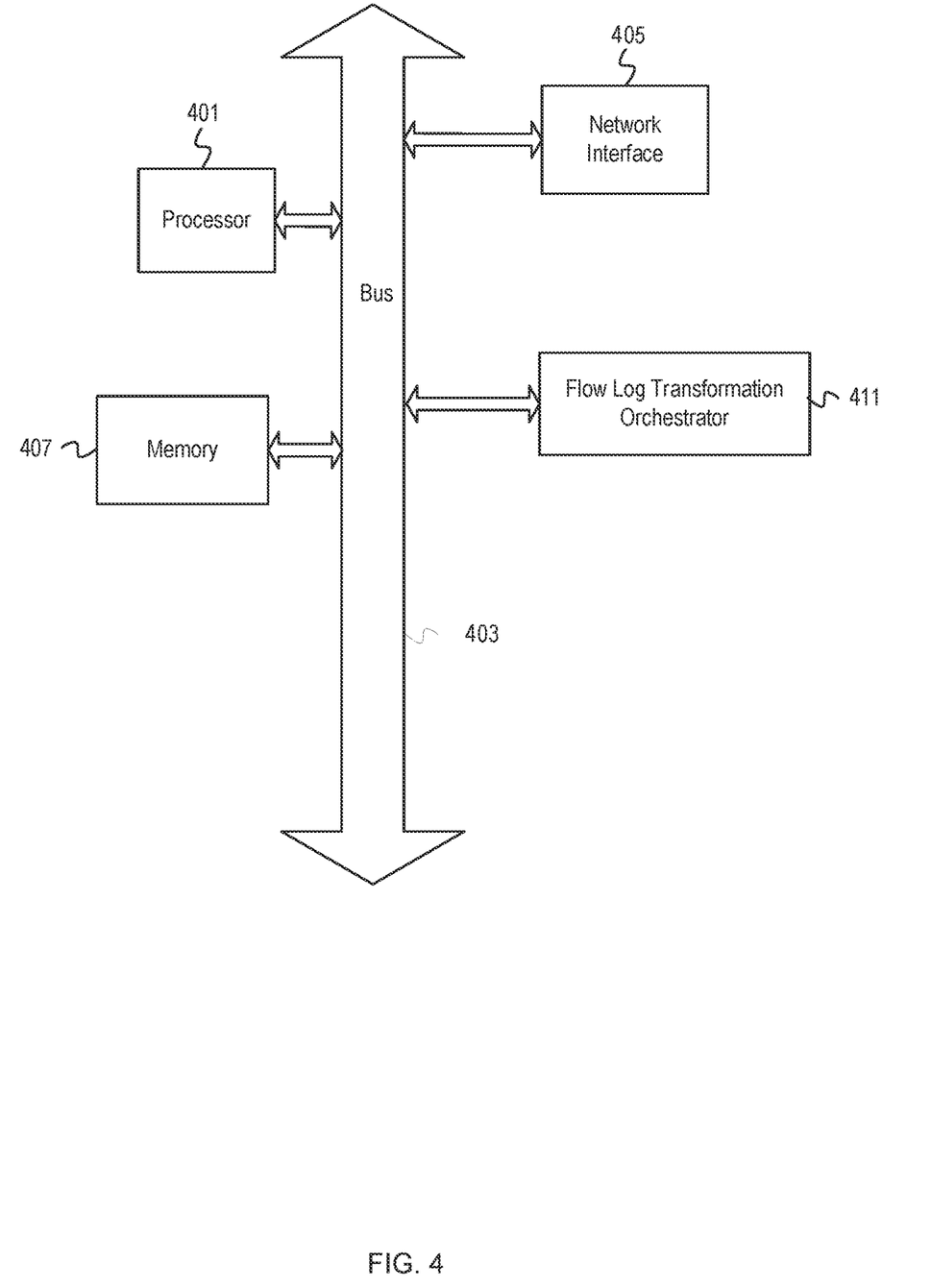
FIG. 4 depicts an example computer system with a flow log transformation orchestrator.

FIG. 4 depicts an example computer system with a flow log transformation orchestrator. The computer system includes a processor 401 (possibly including multiple processors, multiple cores, multiple nodes, and/or implementing multi-threading, etc.). The computer system includes memory 407. The memory 407 may be system memory or any one or more of the above already described possible realizations of machine-readable media. The computer system also includes a bus 403 and a network interface 405. The system also includes flow log transformation orchestrator 411. The flow log transformation orchestrator 411 orchestrates large-scale ETL operations for flow logs generated for network interfaces of instances deployed to a cloud. Any one of the previously described functionalities may be partially (or entirely) implemented in hardware and/or on the processor 401. For example, the functionality may be implemented with an application specific integrated circuit, in logic implemented in the processor 401, in a co-processor on a peripheral device or card, etc. Further, realizations may include fewer or additional components not illustrated in FIG. 4 (e.g., video cards, audio cards, additional network interfaces, peripheral devices, etc.). The processor 401 and the network interface 405 are coupled to the bus 403. Although illustrated as being coupled to the bus 403, the memory 407 may be coupled to the processor 401.

While the aspects of the disclosure are described with reference to various implementations and exploitations, it will be understood that these aspects are illustrative and that the scope of the claims is not limited to them. In general, techniques for automated orchestration of large-scale ETL operations for flow logs as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

This description uses shorthand terms related to cloud technology for efficiency and ease of explanation. When referring to "a cloud," this description is referring to the resources of a cloud service provider. For instance, a cloud can encompass the servers, virtual machines, and storage devices of a cloud service provider. The term "cloud destination" and "cloud source" refer to an entity that has a network address that can be used as an endpoint for a network connection. The entity may be a physical device (e.g., a server) or may be a virtual entity (e.g., virtual server or virtual storage device). In more general terms, a cloud service provider resource accessible to customers is a resource owned/managed by the cloud service provider entity that is accessible via network connections. Often, the access is in accordance with an application programming interface or software development kit provided by the cloud service provider.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
    identifying a first location in storage of flow logs generated for one or more network interfaces;
    determining if a parameterized template for a compression job is available;
    based on determining that a parameterized template for a compression job is available, initiating the compression job to compress the flow logs based on providing values for a plurality of parameters of the parameterized template;
    based on detecting completion of the compression job, identifying a second location in storage that stores compressed flow logs resulting from the compression job, wherein the compressed flow logs comprise a compressed version of the flow logs; and
    designating the compressed flow logs for threat analysis.

2. The method of claim 1 further comprising:
    based on detecting completion of the compression job, determining if an error occurred during the compression job; and
    based on determining that an error occurred, retrying the compression job.

3. The method of claim 2, wherein determining if an error occurred during the compression job comprises selecting a random sample from the compressed flow logs and analyzing the random sample of the compressed flow logs to determine if the compressed flow logs conform to an expected format, and wherein determining that an error occurred comprises determining that the random sample of the compressed flow logs does not conform to the expected format.

4. The method of claim 3 further comprising:
    based on determining that an error occurred during the compression job, determining if a count of error corrections satisfies a threshold; and
    based on determining that the count does not satisfy the threshold, retrying the compression job and incrementing the count of error corrections; and
    based on determining that the count satisfies the threshold, designating the flow logs in the first location in storage for threat analysis.

5. The method of claim 1, wherein the plurality of parameters of the parameterized template comprises a read location parameter and a write location parameter, and wherein providing the values for the plurality of parameters comprises providing an indication of the first location in storage as a value for the read location parameter and an indication of the second location in storage as a value for the write location parameter.

6. The method of claim 1, wherein the first and second locations in storage are first and second locations in cloud storage, and wherein designating the compressed flow logs for threat analysis comprises retrieving the compressed flow logs from the second location in cloud storage for threat analysis.

7. The method of claim 1, wherein the network interfaces are network interfaces in a cloud environment.

8. The method of claim 7, wherein determining if a parameterized template is available comprises determining if a provider of the cloud environment offers a data processing pipeline and a parameterized template for compression jobs performed by the data processing pipeline.

9. The method of claim 8 further comprising:
    based on determining that the provider of the cloud environment does not offer a data processing pipeline and a parameterized template for compression jobs, provisioning a cluster for execution of the compression job;
    determining a generic parameterized template that is not associated with the provider of the cloud environment to use for the compression job; and
    initiating the compression job based on communicating to the cluster an indication of the generic parameterized template and at least a subset of the values for corresponding parameters of the generic parameterized template.

10. The method of claim 8, wherein initiating the compression job comprises communicating a request to the provider of the cloud environment that indicates the parameterized template for compression jobs and the values for the plurality of parameters via an application programming interface (API) exposed by the provider of the cloud environment.

11. One or more non-transitory machine-readable media having program code stored thereon, the program code comprising instructions to:
    identify a first location in storage of flow logs generated for one or more network interfaces;
    determine whether a compression job template is available;
    based on a determination that a compression job template is available, provide a plurality of values corresponding to a plurality of parameters of the compression job template to initiate compression of the flow logs;
    based on detection that the compression of the flow logs has completed, identify a second location in storage in which a compressed version of the flow logs is stored; and designate the compressed version of the flow logs for threat analysis.

12. The non-transitory machine-readable media of claim 11, wherein the program code further comprises instructions to:
based on detection that the compression version of the flow logs has completed, sample a subset of the compressed version of the flow logs;
analyze the subset of the compressed version of the flow logs to determine whether the compressed version of the flow logs conforms to an expected format; and
based on a determination that the compressed version of the flow logs does not conform to an expected format, retry compression of the flow logs.

13. The non-transitory machine-readable media of claim 11, wherein the plurality of parameters of the compression job template comprise parameters accepting at least one of a read location, a write location, and a compression algorithm as values, and wherein providing the values for the plurality of parameters comprises providing at least one of an indication of the first location in storage, an indication of the second location in storage, and a first compression algorithm as values for the plurality of parameters.

14. The non-transitory machine-readable media of claim 11, wherein the network interfaces are network interfaces in a cloud environment, and wherein the instructions to determine whether a compression job template is available comprise instructions to determine if a provider of the cloud environment offers a data processing pipeline and a parameterized template for compression jobs performed by the data processing pipeline.

15. The non-transitory machine-readable media of claim 14, wherein the program code further comprises the instructions to initiate the compression job, wherein the instructions to initiate the compression job comprise instructions to communicate a request to the provider of the cloud environment that indicates the compression job template and the values for the plurality of parameters via an application programming interface (API) exposed by the provider of the cloud environment.

16. An apparatus comprising:
a processor; and
a computer-readable medium having instructions stored thereon that are executable by the processor to cause the apparatus to,
identify a first location in storage of flow logs generated for one or more network interfaces;
determine if a parameterized job template for a compression job is available;
based on a determination that a parameterized job template for a compression job is available, initiate the compression job to compress the flow logs based on providing values for a plurality of parameters of the parameterized job template;
based on detection that the compression job has completed, identify a second location in storage that stores compressed flow logs resulting from the compression job, wherein the compressed flow logs comprise a compressed version of the flow logs; and
designate the compressed flow logs for threat analysis.

17. The apparatus of claim 16 further comprising instructions executable by the processor to cause the apparatus to:
based on detection of completion of the compression job, select a sample from the compressed flow logs; and
analyze the sample of the compressed flow logs to determine if the compressed flow logs conform to an expected format.

18. The apparatus of claim 17 further comprising instructions executable by the processor to cause the apparatus to:
based on a determination that the compressed flow logs do not conform to the expected format, determining if a count of error corrections for the compression job satisfies a threshold;
based on a determination that the count does not satisfy the threshold, retry the compression job and increment the count of error corrections; and
based on a determination that the count satisfies the threshold, designate the flow logs in the first location in storage for threat analysis.

19. The apparatus of claim 16, wherein the network interfaces are network interfaces in a cloud environment, and wherein the instructions executable by the processor to cause the apparatus to determine whether a compression job template is available comprise instructions executable by the processor to cause the apparatus to determine if a provider of the cloud environment offers a data processing pipeline and a parameterized template for compression jobs performed by the data processing pipeline.

20. The apparatus of claim 19, wherein the instructions executable by the processor to cause the apparatus to initiate the compression job comprise instructions executable by the processor to cause the apparatus to communicate a request to the provider of the cloud environment that indicates the parameterized job template and the values for the plurality of parameters via an application programming interface (API) exposed by the provider of the cloud environment.

* * * * *